United States Patent [19]

Hata et al.

[11] Patent Number: 4,933,582
[45] Date of Patent: Jun. 12, 1990

[54] MAGNET-RETAINING STRUCTURE FOR MOTOR

[75] Inventors: Toyohiko Hata; Etsuo Aoki, both of Tokyo, Japan

[73] Assignee: Calsonic Corporation, Tokyo, Japan

[21] Appl. No.: 328,025

[22] Filed: Mar. 23, 1989

[30] Foreign Application Priority Data

Mar. 25, 1988 [JP] Japan .............................. 63-38372[U]

[51] Int. Cl.$^5$ .............................................. H02K 21/26
[52] U.S. Cl. ...................................... 310/154; 310/42; 310/71; 310/89; 310/91
[58] Field of Search ...................... 310/154, 89, 91, 71, 310/239, 233, 239, 42, 90, 248

[56] References Cited

U.S. PATENT DOCUMENTS

| | | | |
|---|---|---|---|
| 3,165,654 | 1/1965 | Mabuchi | 310/154 |
| 3,789,251 | 1/1974 | King | 310/90 |
| 4,295,268 | 10/1981 | Punshon | 310/42 |
| 4,619,588 | 10/1986 | Moore, III | 310/154 |
| 4,677,333 | 6/1987 | Auzolat | 310/239 |
| 4,745,319 | 5/1988 | Tomite | 310/154 |

FOREIGN PATENT DOCUMENTS

| | | | |
|---|---|---|---|
| 2735778 | 3/1978 | Fed. Rep. of Germany | 310/154 |
| 0125068 | 9/1980 | Japan | 310/154 |
| 0876574 | 9/1961 | United Kingdom | 310/154 |
| 1014163 | 12/1965 | United Kingdom | 310/154 |

*Primary Examiner*—R. Skudy
*Attorney, Agent, or Firm*—Gordon W. Hueschen

[57] ABSTRACT

This invention is directed to a magnet-retaining structure for a motor, which comprises a cylindrical casing, two semicircular magnets inserted in the cylinderical casing, a resilient retainer whose resilient force fixes the semicircular magnets to the inner surface of the casing, and a coupler provided with brushes. Owing to the construction, the magnet-retaining structure permits simplification of the manufacture of component parts of the motor, facilitates the work of final assembly of the motor, and prevents the resilient retainer from dislocation and the magnets from displacement in the axial direction.

5 Claims, 4 Drawing Sheets 0,933,582

MAGNET-RETAINING STRUCTURE FOR MOTOR

BACKGROUND OF THE INVENTION

This invention relates to a D.C. Motor and more particularly to improvements in and concerning a magnet-retaining structure therefor.

DESCRIPTION OF THE PRIOR ART

The D.C. motor is used for the purpose of driving the blower of an air conditioner in an automobile, for example.

The D.C. motors of this kind are provided in the interiors thereof with a magnet serving to form a magnetic field. They come in two types; one type having the magnet attached fast with adhesive agent to the inner wall surface of the casing thereof and the other type having the magnet fastened to the inner wall surface of the casing thereof by virtue of the resilient force of a resilient retainer (Japanese Laid-Open Utility Model Application SHO No. 60(1985)-93,465).

The D.C. motors of the former type which have the magnet attached with adhesive agent to the iner wall surface of the casing thereof have the possibility that the magnet will separate from the inner wall surface of the casing in consequence of the degradation of the adhesive agent by aging. These motors, during the course of assembly, require a heating treatment for drying the adhesive agent and consequently entail a disadvantage that the heat treatment jeopardizes the operational efficiency of the assembly.

The motors of the latter type which have the magent fastened to the inner wall surface of the casing thereof by virtue of the resilient force of a resilient retainer are efficiently assembled without requiring anything equivalent to the heat treatment. Thus, they have been finding popular utility in these years.

The resilient retainer mentioned above is a part obtained by bending a round bar in the shape of the letter U and is inserted between the opposed end faces of magnet. The resilient force of the resilient retainer acts on the magnet in such a manner as to press the magnet outwardly in the radial direction, with the result that the magent is fastened to the inner wall surface of the casing.

When the resilient retainer is merely inserted between the opposed end faces of the magnet, however, there arises the possibility that the resilient retainer will slip off in one axial direcction. Since the resilient force of the resilient retainer acts in the direction of expanding the resilient retainer, the reaction of this resilient force causes the resilient retainer itself to generate a force tending to move it in the direction of the end parts (the directions of the open edges of the U shape). The aforementioned "slip" ensues when this force builds up and exceeds the frictional force between the resilient retainer and the end faces of the magnet. There is the problem that this "slip" tends to occur more readily as the resilient force of the resilient retainer increases. This remark is equivalent to a statement that the inclination of the resilient retainer toward the phenomenon of slip grows in proportion as the outward pressure of the magnet in the radial direction is enhanced. This inclination will eventually hinder the fastness with which the magnet is attached to the inner wall surface of the casing.

The motor disclosed in the utility model publication mentioned above is not furnished with any means for preventing the magnet from moving in the counterpower side and, therefore, entails a disadvantage that the magnet will be compelled by the condition of the motor's installation or the vibration exerted on the motor to move in the axial direction.

For the purpose of preventing the resilient retainer from the slip and the magnet from the displacement, there must be adopted such a measure as providing the casing with a projection capable of establishing fast union between the magnet and the resilient retainer after the magnet has been attached to the housing with the resilient retainer. This measure has a disadvantage that the process of manufacture of the motor gains appreciably in complexity.

The inventors have continued a diligent study with a view to solving the drawbacks inherent in the conventional techniques as mentioned above. They have consequently developed a magnet-retaining structure for a motor, which comprises a cylindrical casing, two semicircular magnets inserted in the cylindrical casing, and a resilient retainer adapted to fasten the semicircular magnets to the inner wall surface of the casing with the resilient force thereof and which, owing to the construction mentioned above, serves to simplify the manufacture of component parts of the motor and enhance the efficiency of the work of final assembly of the motor and, at the same time, prevents the resilient retainer from slip and the magents from displacement in the axial direction.

The first object of this invention is to provide a magnet-retaining structure for a motor, which by virtue of a coupler to be used in fastening two magnets inserted in a cylindrical casing by the resilient force of a resilient retainer to the inner wall surface of the casing, simplifies the manufacture of component parts of the motor, facilitates the work of final assembly of the motor, and prevents the resilient retainer from the slip and the magnets from the displacement in the axial direction.

The second object of this invention is to provide a magnet-retaining structure for a motor, which permits improvement in the sealability of the coupler after its fixation in place.

The third object of this invention is to provide a magnet-retaining structure for a motor, which ensures prevention of the resilient retainer from dislocation in the direciton of the center of the casing.

The fourth object of this invention is to provide a magnet-retaining structure for a motor, which permits prevention of the resilient retainer from the slip and the magnets from the displacement in the axial direction and, at the same time, allows omission of the work of electric connection inside the motor.

The fifth object of this invention is to provide a magnet-retaining structure for a motor, which permits facilitation of the incorporation of a commutator and a brush in the motor casing.

SUMMARY OF THE INVENTION

To accomplish the first object described above, the present invention provides a magnet-retaining structure for a motor comprising a cylindrical blind casing having an opening formed at one end thereof, an end bracket attached to the opening and adapted to close the opening, two semicircular magnets inserted in the casing, an armature rotated across the magnetic lines of flux formed by the magnets, a brush for supplying electric current to the armature through the medium of a commutator, and a coupler for supplying external electric current to the brush, which magnet-retaining structure is characterized by the fact that a coupler insertion hole for permitting attachment of the coupler is formed in the casing by incising a passage down the opening of the casing, first stoppers colliding respectively with those of opposite end faces in the axial direction of each of the magnets which are on the side opposite to the opening and regulating the positions in the axial direction of the magnets on the side opposite to the opening and second stoppers colliding respectively with those of end faces of each of the magnets opposed to each other in the circumferential direction and regulating the positions in the circumferential direction of the magnets are formed on the inner wall surface of the casing, a resilient retainer formed by bending a resilient material in the shape of the letter U and adapted to urge the magnets with the resilient force tending to press the magnets outwardly in the radial direction is inserted between those of the end faces of each of the magnets opposed to each other in the circumferential direction, with the open leg side thereof disposed on the opening side, and the coupler is slid home in the coupler insertion hole from the opening side so as to be nipped between the neighboring parts of the end faces of the end faces of each of the magnets on the opening side which admit insertion of the resilient retainer and the inner wall surface of the end bracket.

Owing to this construction, the two magnets are fixed to the inner wall surface of the casing because the resilient force of the resilient retainer acts so as to press outwardly in the radial direction the two magnets having the positions thereof regulated in the circumferential direction by the second stoppers. The displacement of the two magnets in the axial direction is prevented because the coupler is attached to the coupler insertion hole in such a manner as to be nipped between the two magnets having the positions thereof regulated in the axial direction on the side opposite to the opening by the first stoppers and the inner wall surface of the end bracket. Further, the work of assembly during the attachment of the coupler is greatly facilitated because the coupler is attached as slid in to the coupler insertion hole. Even when the resilient retainer moves in the direction of the opening of the casing, the end part of the resilient retainer collides with the coupler and prevents the resilient retainer from a slip because the coupler collides with the neighboring parts of the end faces on the opening side of each of the magnets which admit the resilient retainer and further because the resilient retainer formed in the shape of the letter U is inserted home with the open leg side thereof disposed on the coupler side. This resilient retainer is simple to manufacture and it is not required to be provided with any means for preventing the resilient retainer form being slipped in the direction opposite to the opening of the casing. Thus, nothing complicates the manufacture of the casing.

To accomplish the second object described above, the present invention provides a magnet-retaining structure for a motor, which is characterized by the fact that the casing has at least the coupler insetion hole formed in a flat surface.

In the construction described above, when the coupler is set in place, the fastness of mutual adhesion between the casing and the coupler is so high as to improve the sealability of the coupler relative to the casing.

To accomplish the third object described above, the present invention provides a magnet-retaining structure for a motor, which is characterized by the fact that at least the end faces of the oposite end faces in the circumferential direction of each of the magnets which are on the side for admitting the insertion of the resilient retainer are formed as slanted so as to prevent the resilient retainer from being dislocated in the direction of the center of the casing.

In this construction, the resilient retainer is not suffered to be dislocated in the direction of the casing even when the resilient force of the resilient retainer acts in such a manner as to press the two magnets outwardly in the radial direction.

To accomplish the fourth object described above, the present invention provides a magnet-retaining structure for a motor, which is characterized by the fact that the coupler is provided on the upper end surface thereof with opposed leaf springs having respectively the brush attached thereto.

In this construction, since the electric connections leading to the brush can be produced during the manufacture of the coupler, the work of electric connectin inside the motor can be omitted. Further, this construction prevents the resilient retainer from being slipped and the magnets from being displaced in the axial direction.

To accomplish the fifth object described above, the present invention provides a magnet-retaining structure for a motor, whcih is characterized by the fact that the commutator is in the shape of a drum.

In this construction, the commutator can be easily positioned between the opposed brushes during the attachment of the coupler to the casing. Thus, the incorporation of the commutator and the brushes is easily attained.

DETAILED DESCRIPTION OF THE PREFERRED EMBODIMENT

Now, the magnet-retaining structure for a motor contemplated by the present invention will be described in detail below with reference to illustrated embodiments.

Figure 1:
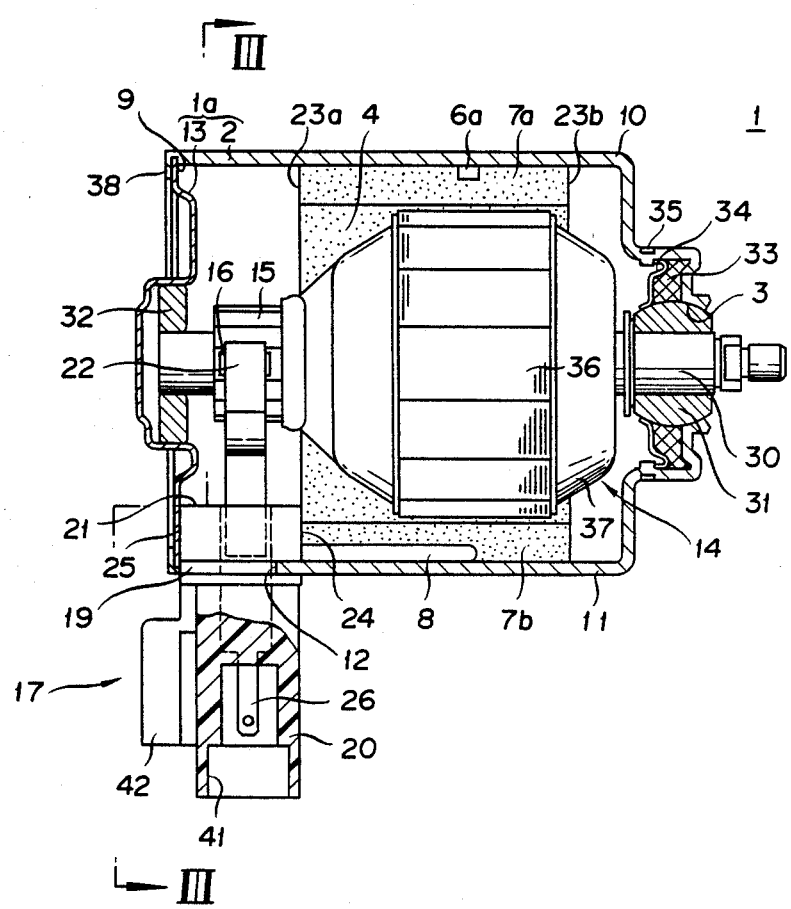
FIG. 1 is a cross section illustrating one embodiment of this invention.

A motor 1 illustrated in FIG. 1 is used for the purpose of driving the blower of an air conditioner in an automobile, for example.

This motor 1 is possessed of a motor body 1a which is composed of a cylindrical blind casing 2 and an end bracket 13 staked to an opening 9 of the casing 2. Similarly to the conventional motor, this motor 1 has magnets 4 attached to the inner wall surface of the casing 2. Inside the magnets 4, an armature 14 is fixed on a rotary shaft 30 as opposed to the magnets across a minute air gap.

The rotary shaft 30 is rotatably supported by an oil-impregnation bearing 31 retained by the casing 2 and an oil-impregnation bearing 32 kept depressed in a recess of the end bracket 13. The two oil-impregnaiton bearings 31, 32 are made of a porous metallic material such as an iron type sintered alloy and are impregnated with lubricant. A felt 33 is attached to the pheriphery of the oil-impregnation bearing 31. For the purpose of maintaining this felt 33 and the oil-impregnaiton bearing 31, a bearing-retaining spring 34 is kept depressed in the casing 2. This bearing-retaining spring 34 is positioned and immobilized by being caught on a plurality of projections 35 formed on the casing 2.

On the armature 14, a multiplicity of slots are formed as extended in the axial direction. An armature coil 37 is formed by having a conductive wire 36 wound around along these slots. When electric current is passed through the armature coil 37, the interaction between the electric current and the magnetic field formed by the magnets 4 generates a rotational force and sets the rotary shaft 30 into motion.

A commutator 15 in the shape of a drum is fixed on the periphery of the rotary shaft 30 juxtaposed to the armature 14. A pair of brushes 16 are held in sliding contact with the periphery of this commutator 15. Thus, the electric current is supplied to the armature coil 37 via the brushes 16 and the commutator 15.

Figure 2:
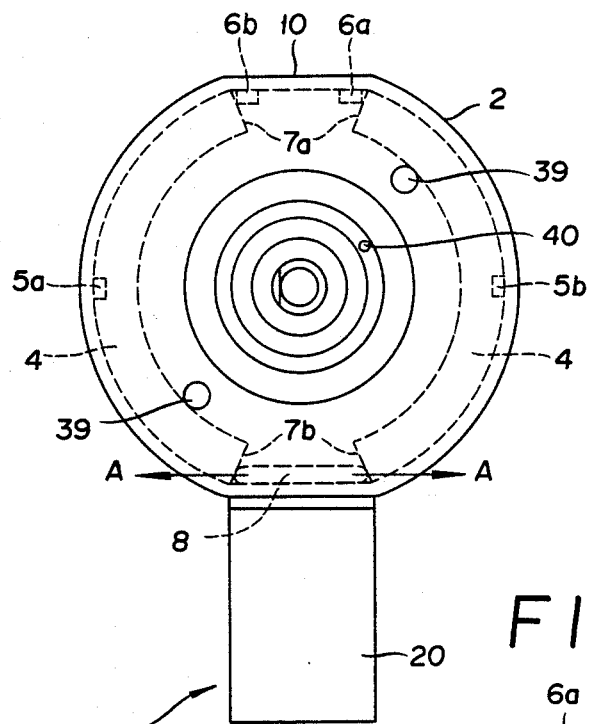
FIG. 2 is a front view of the embodiment.
Figure 3:
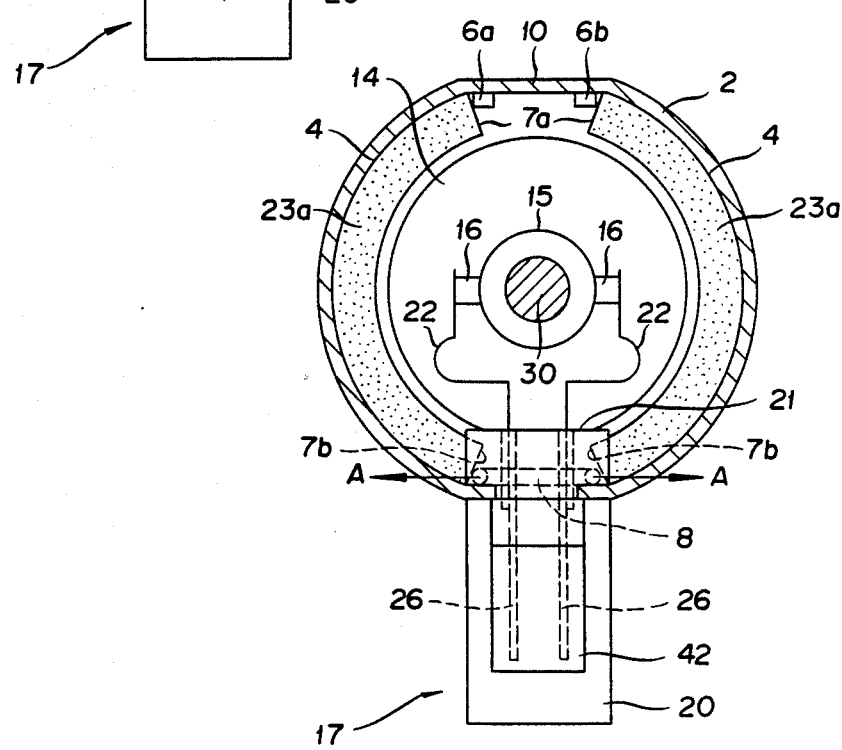
FIG. 3 is a cross section taken through FIG. 1 along the line III—III.
Figure 4:
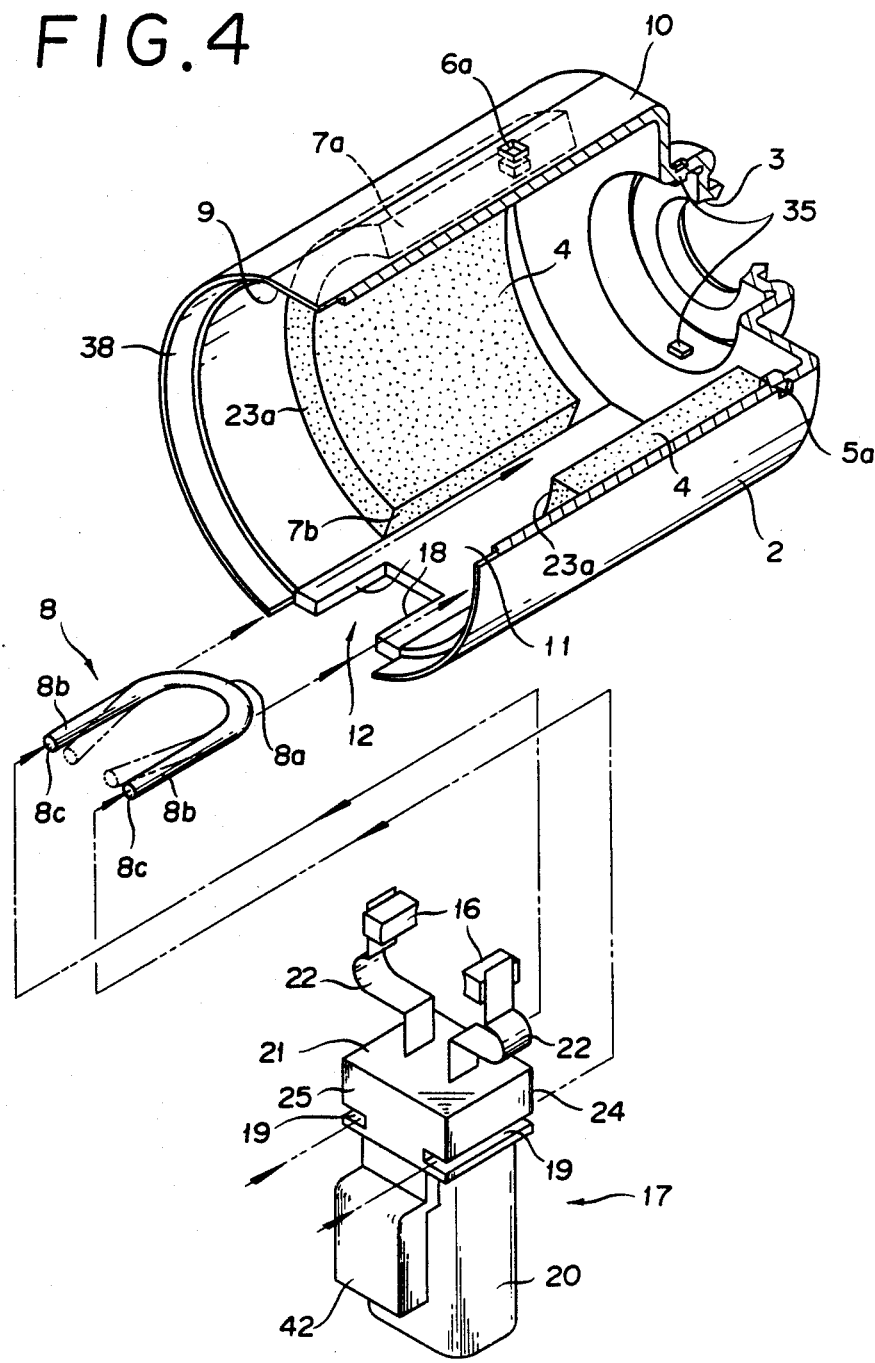
FIG. 4 is a perspective view illsutrating the essential part of the embodiment in an exploded state.

The casing 2 has flat faces 10, 11 formed respectively on the upper and lower parts thereof as illustrated in FIG. 2 to 4.

In the power side end face of the casing 2, a center hole 3 for the insertion of the rotary shaft 30 is formed. Further in the power side end face, a burring hole 39 for allowing the motor body 1a to be helically fixed to other member such as a fan case and a respiratory vent 40 communicating with the motor interior are formed.

In the opening 9 on the counter-powder side of the casing 2, a staking part 38 to be used for staking the end bracket 13 is formed as illustrated in FIG. 1 and FIG. 4.

The two magnets 4, 4 each have a semicircular shape and are possessed of an outer peripheral surface matched to the shape of the inner wall surface of the arcuate part of the casing 2 and an inner peripheral surface opposed to the armature 14 across a minute air gap. The two end faces 7a, 7b in the circumferential direction of each of the magnets 4, 4 are so formed as to be directed substantially to the central axis of the casing 2 when the magnets 4, 4 are set in place inside the casing 2.

For the purpose of regulating the power side positions of each of the magnets 4, 4 in the axial direciton, first stoppers 5a, 5b are formed in the arcuate part of the casing 2. These first stoppers 5a, 5b are adapted so that the end faces 23b of the opposed end faces 23a, 23b of each of the magnets 4, 4 in the axial direciton which are on the side opposite to the opening 9 will collide with the first stoppers 5a, 5b.

Similarly for the purpose of regulating the positions of the magnets in the circumferential direction, second stoppers 6a, 6b are formed on one flat face 10 of the casing 2 in such a manner that the end faces 7a, 7b of the two opposed faces 7a, 7b of each of the magnets 4, 4 in the circumferential direction will collide with the second stoppers 6a, 6b.

In the other flat face 11 of the casing 2, a coupler insertion hole 12 for permitting the attachment of the coupler 17 as described specifically hereinafter is formed as incised to a stated position from the opening 9.

For the purpose of fixing the magnets 4, 4 to the inner wall surface of the casing 2, a magnet-fixing member 8 intended as a resilient retainer is inserted between the end faces 7b, 7b of each of the magnets 4,4.

This magnet-fixing member 8 is formed by bending a resilient material in the shape of the general letter U as illustrated in FIG. 4, so that the width thereof at the leading end part 8a thereof is substantially equal to the distance between the end faces 7b, 7b of magnet and the width embracing the end parts 8c of the two leg parts 8b, 8b is slightly larger than the aforementioned distance. The magnet-fixing member 8 is inserted in such a manner that the two leg parts 8b thereof assume their positions on the opening 9 side of the casing 2.

When the magnet-fixing member 8 is inserted as described above, the resilient force thereof will act upon the two magnets 4, 4 which have the positions thereof regulated in the circumferential direction. By this resilient force, the two magnets 4, 4 are pressed outwardly in the radial direction and fixed to the inner wall surface of the casing 2.

In the magnet-retaining structure of the present invention, a coupler 17 adapted to supply external electric current to the brush 16 is attached to the casing 2 in such a manner as to be nipped between the end faces 23a of each of the magnets 4,4 in the axial direction and the inner wall surface of the end bracket 13. By this coupler 17, the magnets 4, 4 are prevented from being displaced toward the counter-power side and the magnet-fixing member 8 is prevented from being slipped off toward the counter-power side.

To be more specific, the coupler 17 is possessed of a coupler body 20 made of a resinous material. In the coupler body 20, a receiving hole 41 to which a connector (not shown) connected to an outside power source is attached is formed. A connector-fixing member 42 adapted to snap into engagement with a claw part (not shown) of the connector when the connector is set in place and then prevent the connector from being dislocated is formed in the coupler body 20. Further, on the opposite lateral faces of the coupler body 20, guide grooves 19 are formed along the flat lateral faces 18 of a coupler insertion hole 12. The coupler 17 is so adapted as to be guided by the guide grooves 19 and attached to the coupler insertion hole 12 as slid therein from the opening 9 side.

On the upper end face 21 of the coupler body 20, a pair of leaf springs 22 each provided at the leading end thereof with a brush 16 are installed. Owing to the resilient force of the leaf springs 22, the brushes 16 are allowed to collide suitably with the commutator 15. Inside the coupler body 20, the leaf springs 22 are electrically connected to terminals 26. When the connector is mounted on the coupler body 20, the electric current from the external power source is supplied to the commutator 15 via the terminals 26, the leaf springs 22, and the brushes 16.

While the motor 1 is in its assembled state, the front face 24 of the coupler 17 collides with the end faces 23a of the magnets 4, 4 on the counter-power side and the rear surface 25 thereof collides with the inner wall surface of the end bracket 13. At this time, the end part 8c of the magnet-fixing member 8 need not be held in contact with the front face 24 of the coupler 17.

Now, the operation of the magnet-retaining structure of this invention will be described.

First, to assemble the motor 1, the oil-impregnation bearing 31, the fellt 33, and the bearing-retaining spring 34 are attached to the casing 2 which has been formed by pressing.

In this case, the bearing-retaining spring 34 has only to be depressed past the projections 35 in order to be firmly cauaght by the projections 35. As the result, the oil-impregnation bearing 31 is easily positioned and fixed infallibly.

Then, the two magnets 4, 4 are inserted into the casing 2 and disposed so as to collide with the first and second stoppers 5a, 5b, 6a, and 6b. Subsequently, the magnet-fixing member 8, with the two leg parts 8b, 8b kept urged toward each other, is inserted as led by the leading end 8a thereof between the end faces 7b, 7b of the two magnets 4, 4 in the circumferential direction. When the magnet-fixing member 8 is inserted to a stated position, the two leg parts 8b, 8b are relieved of the urge exerted thereon. As the result, the resilient force of the magnet-fixing member 8 is exerted in the direction A illustrated in FIG. 2 and 3 and the magnets 4, 4 are pressed outwardly in the radial direction and fixed to the inner wall surface of the casing 2.

The fixation of the magnets 4 inside the casing 2 can be attained exclusively by the resilient force of the magnet-fixing member 8. The heat treatment which is performed for the purpose of drying adhesive agent when the fixation of the magnets is effected by the use of adhesive agent is not required at all in the present invention. As the result, the efficiency of the work of motor assembly is appreciably improved. Generally, for the purpose of protecting the casing 2 againt corrosion, this casing 2 is coated with a corrosionproofing paint before the motor 1 is assembled. Since the motor of this invention requires no heat treatment as described above, it has absolutely no use for a coating material which is resistant to corrosion and to heat as well. Even with a relatively inexpensive coating material, the casing 2 is enabled to retain sufficient corrosionproofness. Thus, the motor of this invention has an economic advantage that it enjoys a saving in the cost of coating.

Then, the rotary shaft 30 to which the armature 4 and the commutator 15 have been fixed is inserted into the central hole 3.

Now, the opposite lateral flat faces 18 of the coupler insertion hole 12 are fitted in the guide grooves 19 of the coupler 17 and the coupler 17 is slid in the coupler insertion hole 12. Then, by further driving the coupler 17 in, the front face 24 thereof is made to collide with the end faces 23a of the two magnets 4, 4.

In this case, since the commutator 15 is in the shape of a drum and the commutator 15 can be easily positioned between the opposed brushes 16, the mutual attachment of the commutator 15 and the brushes 16 can be attained easily. Further, since the electric connection from the terminals 26 to the brushes 16 has been already made during the manufacture of the coupler, the electric connection (such as soldering) inside the motor during the assembly of the motor 1 can be omitted. Thus, the efficiency of the work of motor assembly is markedly improved.

Then, the oil-impregnation bearing 32 is depressed into the recess of the end bracket 13 which has been formed by pressing. This end bracket 13 is attached to the opening 9 of the casing 2 to stake the staking part 38 of the casing 2. As the result, the opening 9 of the casing 2 is closed and the inner wall surface of the bracket 13 collides with the rear face 25 of the coupler 17.

As a result of the attachment of the end bracket 13 completed as described above, the coupler 17 is nipped between the end faces 23a of the magnets 4, 4 and the inner wall surface of the end bracket 13. The two magnets 4, 4, therefore, are fixed between the first stoppers 5a, 5b and the coupler 17 and prevented from being displaced in the axial direction.

In the meantime, the reaction of the resilient force urging the magnets 4 acts on the magnet-fixing member 8 inserted home as described above in such a manner as to give rise to a force tending to move the magnet-fixing member 8 toward the counter-power side. When this force builds up and surpasses the frictional force generated with the end faces 7b of the magnets, the displacement of the magnet-fixing member 8 in the direction of the opening 9 begins to occur. Even when this displacement is produced, the magnet-fixing member 8 is never allowed to slip toward the counter-power side from between the magnets 4 because the end face 8c of the magnet-fixing member 8 collides with the front face 24 of the coupler 17. An addition to the resilient force of the magnet-fixing member 8 and a consequent increase of the pressure against the magnets 4 bring about absolutely no hindrance to the fixation of the magnets 4 because the increased resilient force, though suffered to produce the displacement, is prevented from inducing the dislocation by the coupler 17.

Since the force which originates in the reaction of the resilient force of the magnet-fixing member 8 never tends to displace the fixing member 8 itself toward the power side, there is no need of employing any measure for preventing the magnet-fixing member 8 from being dislocated toward the power side.

Since the displacement of the two magnets 4, 4 and the dislocation of the magnet-fixing member 8 are precluded as described above, the two magnets 4, 4 are infallibly fixed to the inner wall surface of the casing 2.

Further, the magnet-fixing member 8 is never dislocated in the direction of the rotary shaft 30 because the opposite end faces 7b, 7b of the magnets 4, 4 are formed so as to be directed substantially toward the central axis of the casing 2.

Moreover, the sealability of the coupler 17 during the attachement thereof can be easily improved because the coupler insertion hole 12 of the casing 2 is formed in a flat face and is allowed to come into intimate contact with the flat face of the guide grooves 19 of the coupler 17. The opposite flat faces 10, 11 of the casing 2 facilitate the installation of the motor 1.

Incidentally, in the motor of the closed type under discussion, the air entrapped inside the motor 1 is inflated or shrunken by the temprautre difference when the motor 1 is in operation and when it is at rest. This is called a respiratory action of air. To cope with this respiratory action, the motor 1 of the present invention is provided in the casing 2 with a respiratory vent 40. The interior of the motor 1 communicates with the ambience through this respiratory vent 40. Since the shrinkage of air is not allowed to occur inside the motor 1, the otherwise possible see page of moisture into the motor 1 interior through the minute gap remaining in the staked part of the end bracket 13 can never occur. As the result, the respiratory vent 40 serves to preclude the occurrence of dew which tends to induce an electric trouble without application of a sealing agent to the staked part.

Figure 5:
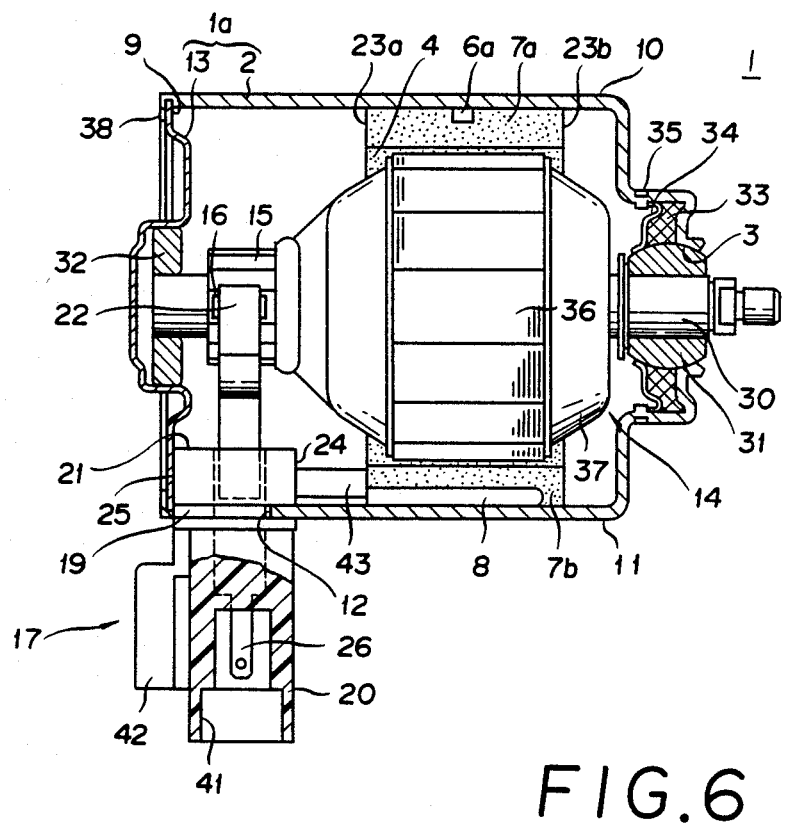
FIG. 5 is a cross section illustrating another embodinment of this invention.
Figure 6:
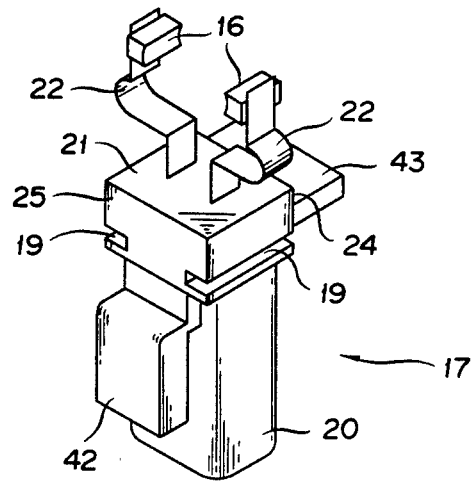
FIG. 6 is a perspective view illustrating the coupler of FIG. 5.

FIG. 5 and FIG. 6 are a cross section illustrating another embodiment of this invention and a perspective view of the coupler of this embodiment.

As illustrated, the coupler 17 of this embodiment has formed integrally with the coupler body 20 a retainer part 43 which extenhds from the front surface 24 toward the power side.

This retainer part 43 is so formed in such a manner that the coupler 17 will collide with the end faces 23 of the two magnets 4, 4 on the counter-power side when this coupler 17 is inserted to the stated position of the coupler insertion hole 12.

The coupler 17 constructed as described above, similarly to the coupler of the former embodiment, can prevent the two magnets 4, 4 from the displacement toward the counter-power side and the magnet-fixing member 8 from the dislocation toward the counter-power side.

In the two embodiments described above, the casing 2 has a flat face 11 formed thereon for the coupler 17 to manifest high sealability at the time of attachment. This shape is not critical to the casing 2. This invention can be applied as effectively to a cylindrical casing to the casing of the shape mentioned above.

The brushes 16 and the leaf springs 22 which are integrally disposed with the coupler 17 are not restricted to the illustrated shapes but may be modified variously.

The center hole 3 for permitting the insertion of the rotary shaft 30 is formed in the casing 2. This particular position is not critical. Optionally, it may be formed in the end bracket 13.

The present invention is not restricted to the motor whose commutator 15 is in the shape of a drum. Optionally it may be applied to the so-called flat motor.

As described above, in the present invention, the coupler is attached to the casing in such a manner as to be nipped between the magnets and the end bracket. When the two semicircular magnets are fixed to the inner wall surface of the casing by the resilient force of the resilient retainer, therefore, the dislocation of the resilient retainer and the displacement of the magnets in the axial direction can be prevented and the magnets can be infallibly fixed. The efficiency of the work of final assembly of the motor is enhanced and the sealability of the motor improved because the coupler insertion hole is formed in a flat face and the coupler is attached to this coupler insertion hole as slid thereon. There is no need of contemplating adoption of a measure for preventing the resilient retainer from being dislocated in the direction of the leading end side because this resilient retainer is formed in the shape of the letter U and, at the same time, it is inserted so that the open leg side thereof falls on the coupler side. This fact contributes to simplifying the manufacture of the component parts of the motor.

Further, the opposed leaf springs to which the brushes are attached are installed on the coupler. As the result, the work of making electric connection inisde the motor can be omitted and the facilitation of the work of assembly can be attained.

We claim:

1. In a motor comprising a cylindrical blind casing (2) having an opening (9) formed at one end thereof, an end bracket (13) attached to said opening (9) and adapted to close said opening (9), two semicircular magnets (4, 4) inserted in said casing (2), an armature (14) rotated across the magnetic lines of flux formed by said magnets (4, 4), a brush (16) for supplying electric current to said armature (14) through the medium of a commutator (15), and a coupler (17) for supplying external electric current to said brush (16), a magnet-retaining structure which is characterized by the fact that a coupler insertion hole (12) for permitting attachment of said coupler (17) is formed in said casing (2) by incising a passage down said opening (9) of said casing (2), first stoppers (5a, 5b) respectively abutting axial end faces (23b) of each of said magnets (4, 4) which are on the side remote from said opening (9) and regulating the positions in the axial direction of said magnets (4, 4) on the side remote from said opening (9) and second stoppers (6a, 6b) respectively abutting opposed first circumferential end faces (7a) of each of said magnets (4, 4) and regulating the positions in the circumferential direction of said magnets (4,4) formed on the inner wall surface of said casing (2), a resilient retainer (8) which is formed by bending a resilient material in the general shape of the letter U and adapted to urge said magnets (4, 4) with the resilient force tending to press said magnets (4,4) outwardly in the radial direction inserted between opposed second circumferential end faces (7b) of each of said magnets (4, 4), with the open leg side (8b) thereof disposed on said opening (9) side, said coupler (17) having formed integrally therewith a retainer part (43) adapted to abut the neighboring parts of said opposed second circumferential end faces (7b) of axial end faces (23a) on the opening (9) side of each of said magnets (4, 4) which admit the insertion of said resilient retainer (8), said coupler (17) being slid home in said coupler insertion hole (12) from said opening (9) side so as to be nipped between said axial end faces (23a) of each of said magnets (4, 4) and the inner wall surface of said end bracket (13).

2. A magnet-retaining structure for a motor according to claim 1, wherein said casing (2) has at least said coupler insertion hole (12) formed in a flat surface.

3. A magnet-retaining structure for a motor according to claim 1, wherein at least the second circumferential end faces (7b) on the opposite end faces (7a, 7b) in the of each of said magnets (4, 4) which are on the side for admitting the insertion of said resilient retainer (8) are slanted so as to prevent said resilient retainer (8) from being dislocated in the direction of the center of said casing (2).

4. A magnet-retaining structure for a motor according to claim 1, wherein brushes (16) are mounted to opposed leaf springs (22) attached to the coupler (17).

5. A magnet-retaining structure for a motor according to claim 1, wherein said commutator (15) is in the shape of a drum.

* * * * *

UNITED STATES PATENT AND TRADEMARK OFFICE
CERTIFICATE OF CORRECTION

PATENT NO. : 4,933,582

DATED : June 12, 1990

INVENTOR(S) : Toyohiko Hata, Etsuo Aoki

It is certified that error appears in the above-identified patent and that said Letters Patent is hereby corrected as shown below:

Title Page, [57] ABSTRACT, line 3; "cylinderical" should read -- cylindrical --.
Column 1, line 4, after BACKGROUND OF THE INVENTION insert -- Field of the Invention --.
Column 1, line 32; "magent" should read -- magnet --.
Column 1, line 44; "magent" should read -- magnet --.
Colimn 1, line 49; "direcction, should read -- direction. --.
Column 2, line 28; "magents" should read -- magnets --.
Column 2, line 32; "two magnets" should read -- two semicircular magnets --.
Column 3, line 25; delete "of the end faces", second occurrence.
Column 3, line 55; "form" should read -- from --.
Column 4, line 23; "connectin" should read -- connection --.
Column 4, line 45; "illsutrating" should read -- illustrating --.
Column 5, line 4; "oil-impregnaiton" should read -- oil-impregnation --.
Column 5, line 9; "oil-impregnaiton" should read -- oil-impregnation --.
Column 5, line 52; "direciton," should read -- direction, --
Column 5, line 56; "direciton" should read -- direction --.
Column 7, line 2; "fellt" should read -- felt --.
Column 7, line 7; "cauaght" should read -- caught --.
Column 7, line 32; "againt" should read -- against --.

UNITED STATES PATENT AND TRADEMARK OFFICE
CERTIFICATE OF CORRECTION

PATENT NO. : 4,933,582

DATED : June 12, 1990

INVENTOR(S) : Toyohiko Hata, Etsuo Aoki

It is certified that error appears in the above-identified patent and that said Letters Patent is hereby corrected as shown below:

```
Column 8, line 45;    "attachement" should read -- attachment --.
Column 8, line 53;    "temprautre" should read -- temperature --.
Column 8, line 62;    "see page" should read -- seepage --.
Column 9, line 6;     "extenhds" should read -- extends --.
Column 10, line 50,51; delete "on the opposite end faces
   (7a, 7b) in the".
```

Signed and Sealed this

Twenty-fourth Day of September, 1991

Attest:

HARRY F. MANBECK, JR.

Attesting Officer

Commissioner of Patents and Trademarks